(12) United States Patent
Keffeler et al.

(10) Patent No.: US 10,435,038 B1
(45) Date of Patent: Oct. 8, 2019

(54) LOCOMOTIVE SANDING SYSTEM

(71) Applicants: Mark G. Keffeler, Omaha, NE (US); David P. Keffeler, Omaha, NE (US)

(72) Inventors: Mark G. Keffeler, Omaha, NE (US); David P. Keffeler, Omaha, NE (US)

( * ) Notice: Subject to any disclaimer, the term of this patent is extended or adjusted under 35 U.S.C. 154(b) by 0 days.

(21) Appl. No.: 16/185,743

(22) Filed: Nov. 9, 2018

(51) Int. Cl.
| | |
|---|---|
| *B61C 15/10* | (2006.01) |
| *F16J 15/08* | (2006.01) |
| *B60B 39/02* | (2006.01) |
| *F16J 15/46* | (2006.01) |
| *B60B 39/08* | (2006.01) |
| *B60B 39/04* | (2006.01) |

(52) U.S. Cl.
CPC ............ *B61C 15/10* (2013.01); *B60B 39/022* (2013.01); *B60B 39/08* (2013.01); *B61C 15/102* (2013.01); *F16J 15/0887* (2013.01); *F16J 15/46* (2013.01); *B60B 39/04* (2013.01)

(58) Field of Classification Search
CPC ....... B61C 15/10; B61C 15/102; B60B 39/04; B60B 39/08; F16J 15/46
USPC ............................................ 291/46; 277/583
See application file for complete search history.

(56) References Cited

U.S. PATENT DOCUMENTS

| | | | | |
|---|---|---|---|---|
| 2,648,554 A * | 8/1953 | Gilbert, Sr. | ............... | F16J 15/46 277/346 |
| 2,943,874 A * | 7/1960 | Valdi | ...................... | B63H 23/36 277/346 |
| 3,178,779 A * | 4/1965 | Clark | ........................ | B64C 1/14 220/232 |
| 3,245,592 A * | 4/1966 | Frantz | ..................... | B61C 15/10 222/517 |
| 3,642,291 A * | 2/1972 | Zeffer | ...................... | F16J 15/46 277/583 |
| 3,689,082 A * | 9/1972 | Satterthwaite | ........... | F16J 15/46 277/346 |
| 3,722,895 A * | 3/1973 | Mevissen | ................. | F16J 15/46 277/583 |
| 3,788,651 A * | 1/1974 | Brown | ..................... | F16J 15/46 277/646 |
| 3,815,926 A * | 6/1974 | Vore | ......................... | F16J 15/40 277/583 |
| 3,940,152 A * | 2/1976 | Fournier | ................... | F16J 15/46 277/641 |
| 4,109,922 A * | 8/1978 | Martin | .................... | B23K 15/06 277/646 |
| 4,342,336 A * | 8/1982 | Satterthwaite | ........ | F16L 55/134 138/90 |
| 4,575,135 A * | 3/1986 | Cervinka | ................ | B60B 39/10 222/146.5 |

(Continued)

*Primary Examiner* — Zachary L Kuhfuss
(74) *Attorney, Agent, or Firm* — Dennis L. Thomte; Thomte Patent Law Office LLC

(57) ABSTRACT

A locomotive sanding system is described for conveying sand from a sand tower to a sand box mounted on a locomotive. The invention is designed to prevent personnel from being subjected to sand and sand dust during the sand box being filled with sand from the sand tower. The system includes a universal sealing nozzle which may be used with the locomotive sanding system or other devices. The universal sealing nozzle includes an expansion seal extending therearound which may be moved from a retracted position to an expanded position. When the nozzle is inserted into the fill pipe of the sand box, the expansion seal is expanded to sealably engage the inside surface of the fill pipe.

1 Claim, 9 Drawing Sheets

(56) References Cited

U.S. PATENT DOCUMENTS

| | | | | |
|---|---|---|---|---|
| 5,209,498 | A * | 5/1993 | Colin | B61D 19/02 |
| | | | | 277/646 |
| 5,893,567 | A * | 4/1999 | Bitterli | B65D 90/626 |
| | | | | 220/234 |
| 6,176,934 | B1 * | 1/2001 | Nelson | F16J 15/46 |
| | | | | 118/715 |
| 6,938,935 | B2 * | 9/2005 | Bartling | B60B 39/04 |
| | | | | 222/509 |
| 7,594,682 | B2 | 9/2009 | Kumar et al. | |
| 8,336,926 | B2 * | 12/2012 | Tober | B60B 39/08 |
| | | | | 291/11.2 |
| 8,517,432 | B2 * | 8/2013 | Bartling | B61C 15/107 |
| | | | | 291/15 |
| 9,308,921 | B2 * | 4/2016 | Worden | B61C 15/107 |
| 9,637,140 | B2 * | 5/2017 | Bartling | B61C 15/102 |
| 9,718,480 | B2 * | 8/2017 | Worden | B61C 15/107 |
| 9,993,908 | B2 | 6/2018 | Schmid | |
| 10,065,661 | B2 * | 9/2018 | Krismanic | B61C 15/10 |
| 10,190,693 | B2 * | 1/2019 | White | F16K 51/02 |
| 2001/0020771 | A1 * | 9/2001 | Nishikawa | F16J 15/008 |
| | | | | 277/511 |

\* cited by examiner

LOCOMOTIVE SANDING SYSTEM

BACKGROUND OF THE INVENTION

Field of the Invention

This invention relates to a locomotive sanding system for conveying sand from a sand tower to a sand box mounted on the locomotive. More particularly, this invention is designed to prevent personnel from being subjected to sand and sand dust during the sand box being filled with sand from the sand tower. Even more particularly, the invention relates to a universal sealing nozzle which may be used with a locomotive sanding system or other devices.

Description of the Related Art

Locomotives usually have one or two sand boxes at each side of the locomotive. The sand boxes contain traction sand which is spread onto the rails of the track forwardly of the drive wheels thereof to provide traction to the drive wheels. The traction sand is conveyed to the sand boxes from a sand tower having traction sand therein.

In the prior art, a valve is in communication with the sand discharge opening of the sand tower. When the valve is in the closed position, sand may not pass therethrough. When the valve is in the open position, sand may flow downwardly therethrough. The prior art sanding systems also include an elongated hose having a sand inlet end and a sand discharge end. The sand inlet end of the hose is in communication with the discharge side of the valve. The discharge end of the hose has a metal discharge tube secured thereto with the metal discharge tube being removably received in the cylindrical fill tube of the sand box during the filling of the sand box with traction sand.

When sand is being filled into the sand box from the sand tower, some sand is blown upwardly from the sand box through the space between the metal discharge tube and the fill tube of the sand box. Further, when the sand box has been filled, the valve will be closed, but the hose which is filled with sand, must be drained which also causes respirable crystalline silica to be discharged into the surrounding area and which also causes the person filling the sand box to be exposed to respirable crystalline silica which may cause silicosis.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A locomotive sanding system is disclosed for conveying sand from a sand tower, having a sand inlet opening and a sand discharge opening, to a sand box mounted on a locomotive with the sand box having a hollow fill tube extending upwardly therefrom with the fill tube having an upper end, an outer side and an inner side. The sand inlet opening of the sand tower is in communication with a source of sand. The system also includes a first valve having a sand inlet and a sand discharge end. The first valve is selectively movable between open and closed positions with the sand inlet end of the first valve being in communication with the sand discharge end of the sand tower. The first valve permits sand to pass downwardly therethrough one end of the open position while preventing sand to pass downwardly therethrough when in the closed position. The system also includes an elongated sand discharge tube having a sand inlet end and a sand discharge end with the sand inlet end of the discharge tube being in communication with the sand discharge end of the first valve. The system also includes a second valve having a sand inlet end and a sand discharge end with the second valve being selectively movable between open and closed positions. The sand inlet end of the second valve is in communication with the sand discharge end of the sand discharge tube. The second valve prevents sand to pass downwardly therethrough when in the closed position while permitting sand to pass downwardly therethrough when in the open position.

The system also includes a hollow sealing nozzle having an upper sand inlet end, a lower sand outlet end and a generally cylindrical body portion extending therebetween. The upper sand inlet of the sealing nozzle is secured to a sand discharge end of the second valve. The cylindrical body portion of the sealing nozzle has an upper annular ring projecting outwardly therefrom with the upper annular ring having an outer side. The cylindrical body portion of the sealing nozzle has a lower annular ring projecting outwardly therefrom below the upper annular ring with the lower annular ring having an outer side. The upper and lower annular rings define an annular recess therebetween. A ring-shaped expansion seal extends around the body portion and is positioned in the annular recess between the upper and lower annular rings. The expansion seal has inner and outer sides with the extension seal being selectively movable between retracted and expanded positions. The expansion seal is in communication with a source of pressurized gas and for moving the expansion seal from the retracted position to the expanded position.

When the sand box is to be filled with sand from the sand tower, the hollow sealing nozzle is inserted downwardly into the fill pipe of the sand box and the expansion seal will be expanded to sealably engage the inside surface of the fill pipe. The sealing nozzle may be used in other environments or situations other than the locomotive sanding system.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
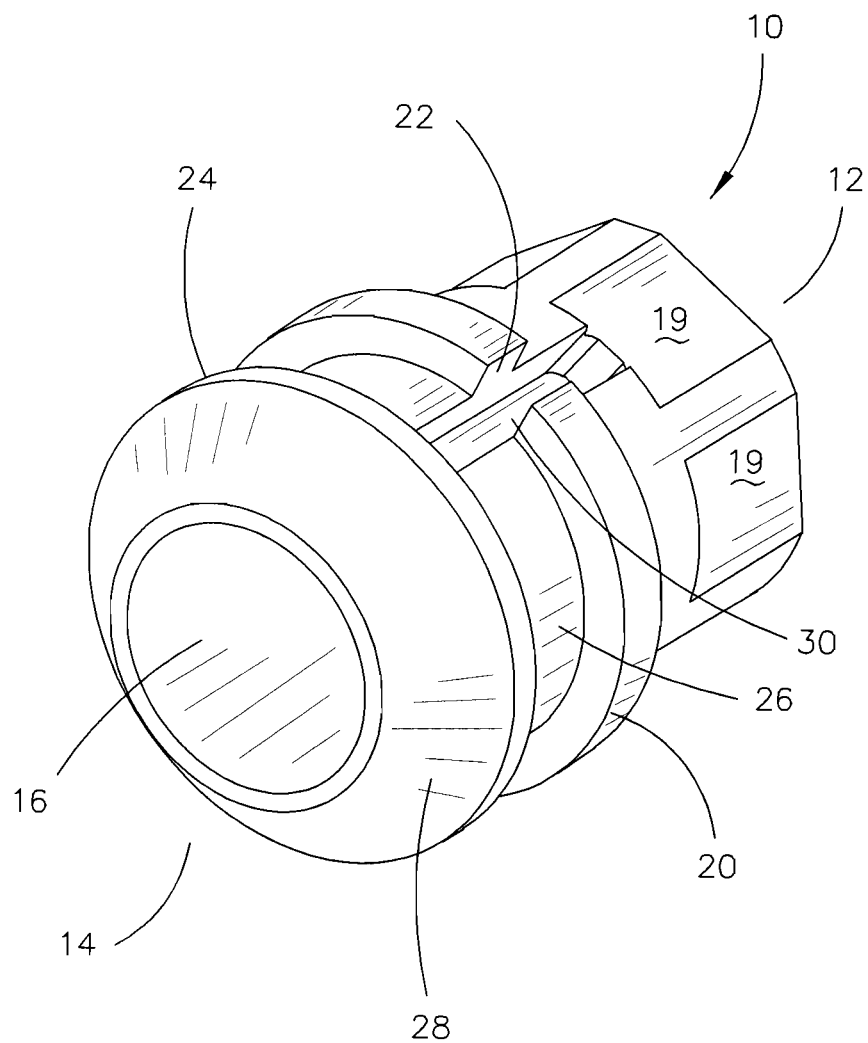
FIG. 1 is a bottom perspective view of the universal sealing nozzle of this invention less the support collar thereof.
Figure 2:
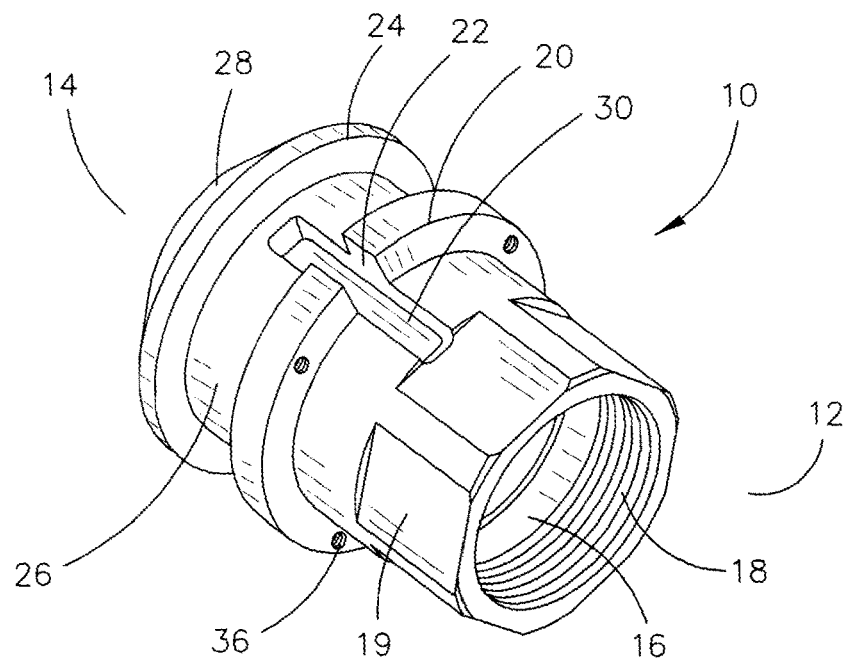
FIG. 2 is an upper perspective view of the universal sealing nozzle of FIG. 1.
Figure 3:
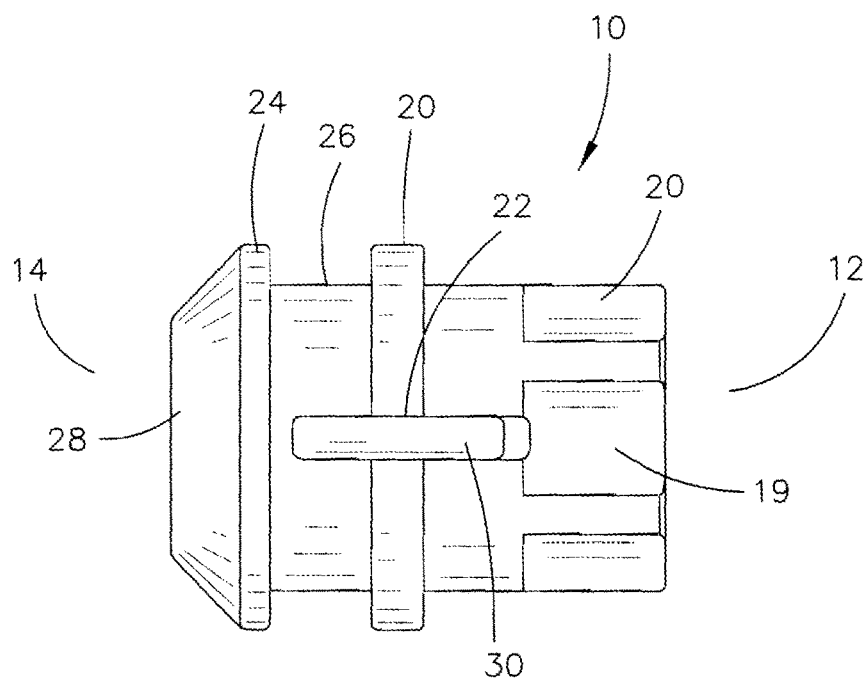
FIG. 3 is a side view of the universal sealing nozzle of FIG. 1.
Figure 4:
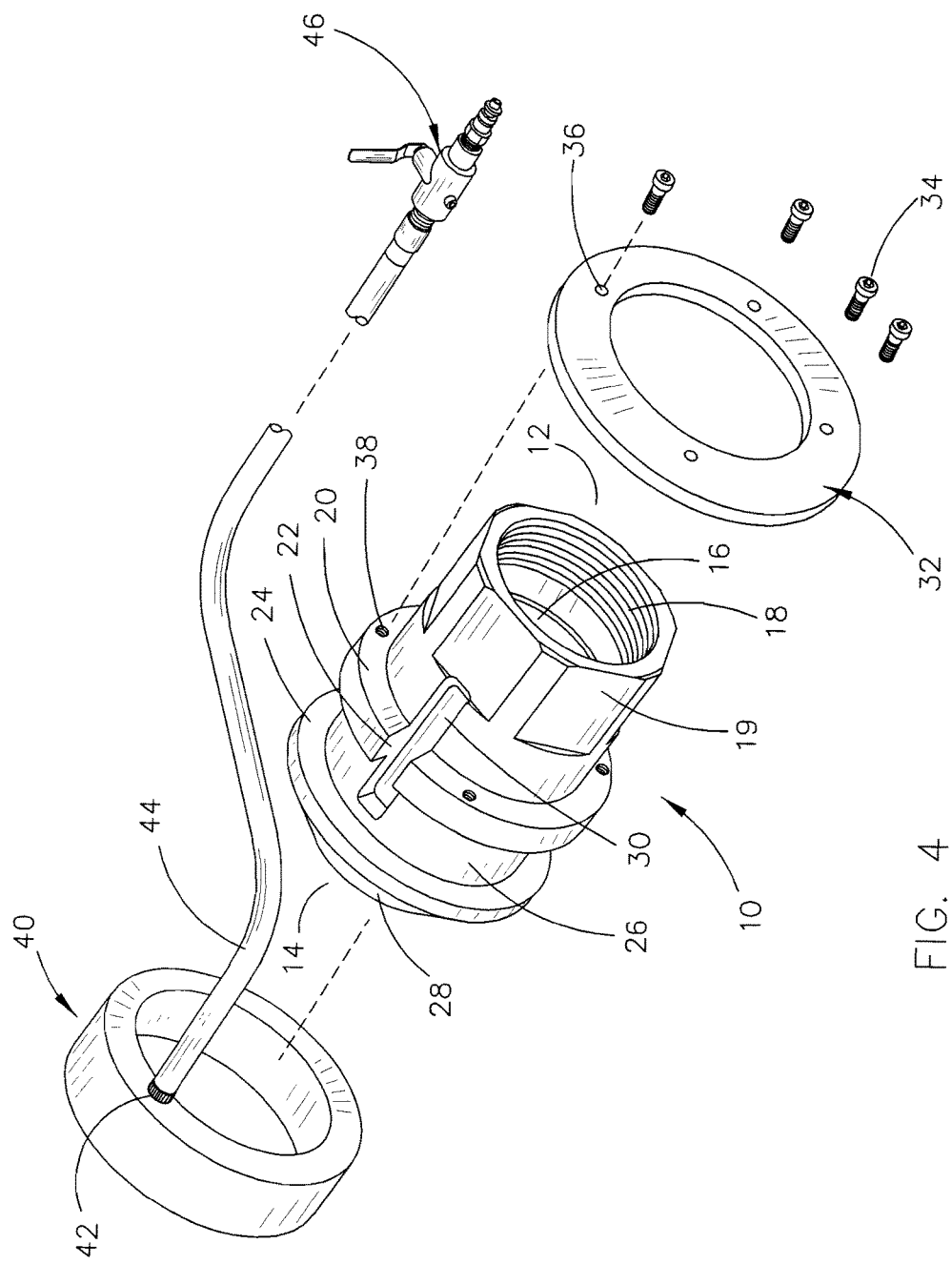
FIG. 4 is a partial exploded perspective view of the universal sealing nozzle of this invention with the support collar and expansion seal being shown.
Figure 5:
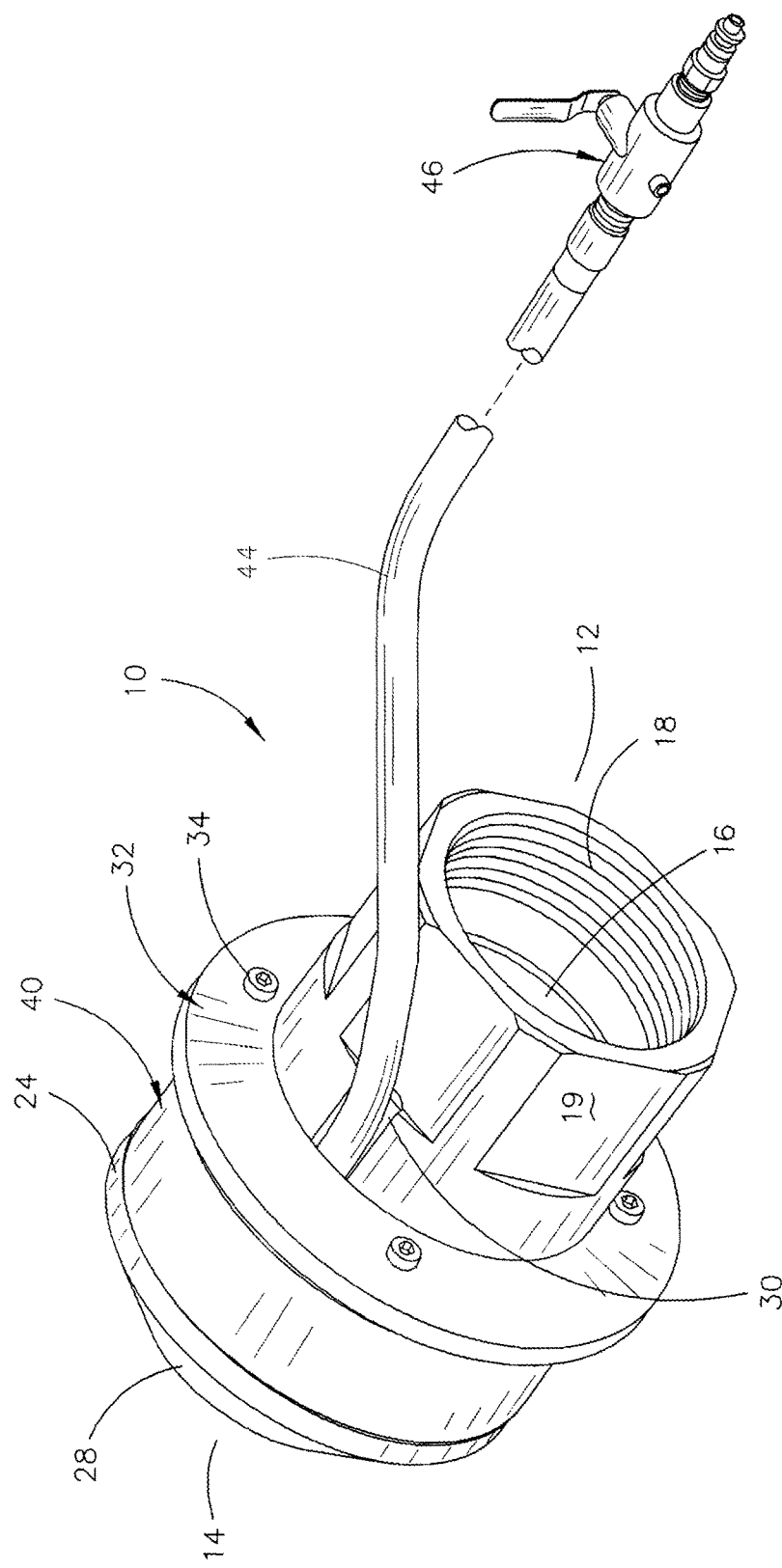
FIG. 5 is a partial perspective view of the assembled universal sealing nozzle of this invention which illustrates the expansion seal thereof in its retracted position.
Figure 6:
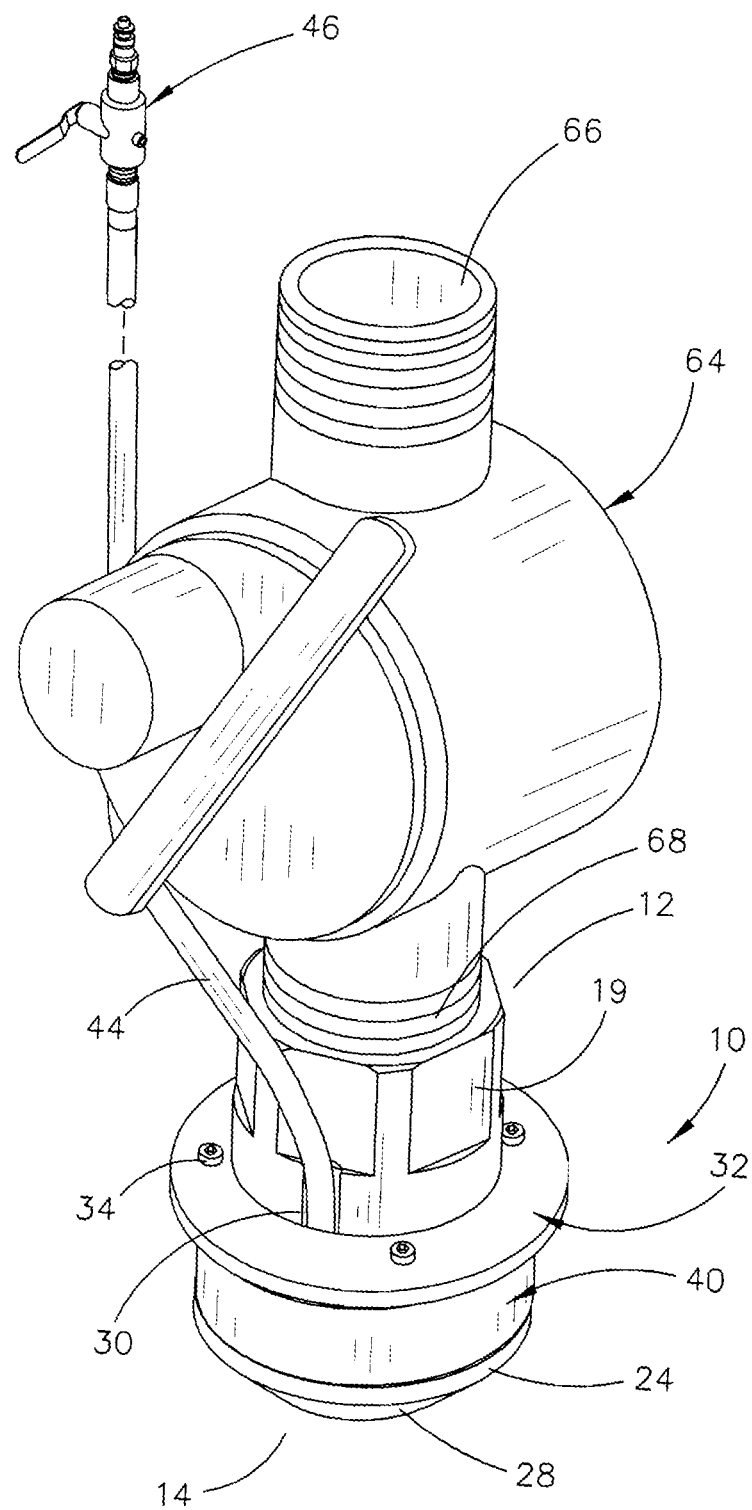
FIG. 6 is a partial perspective view which illustrates the universal sealing nozzle of this invention secured to the discharge end of the lower valve of the invention.
Figure 7:
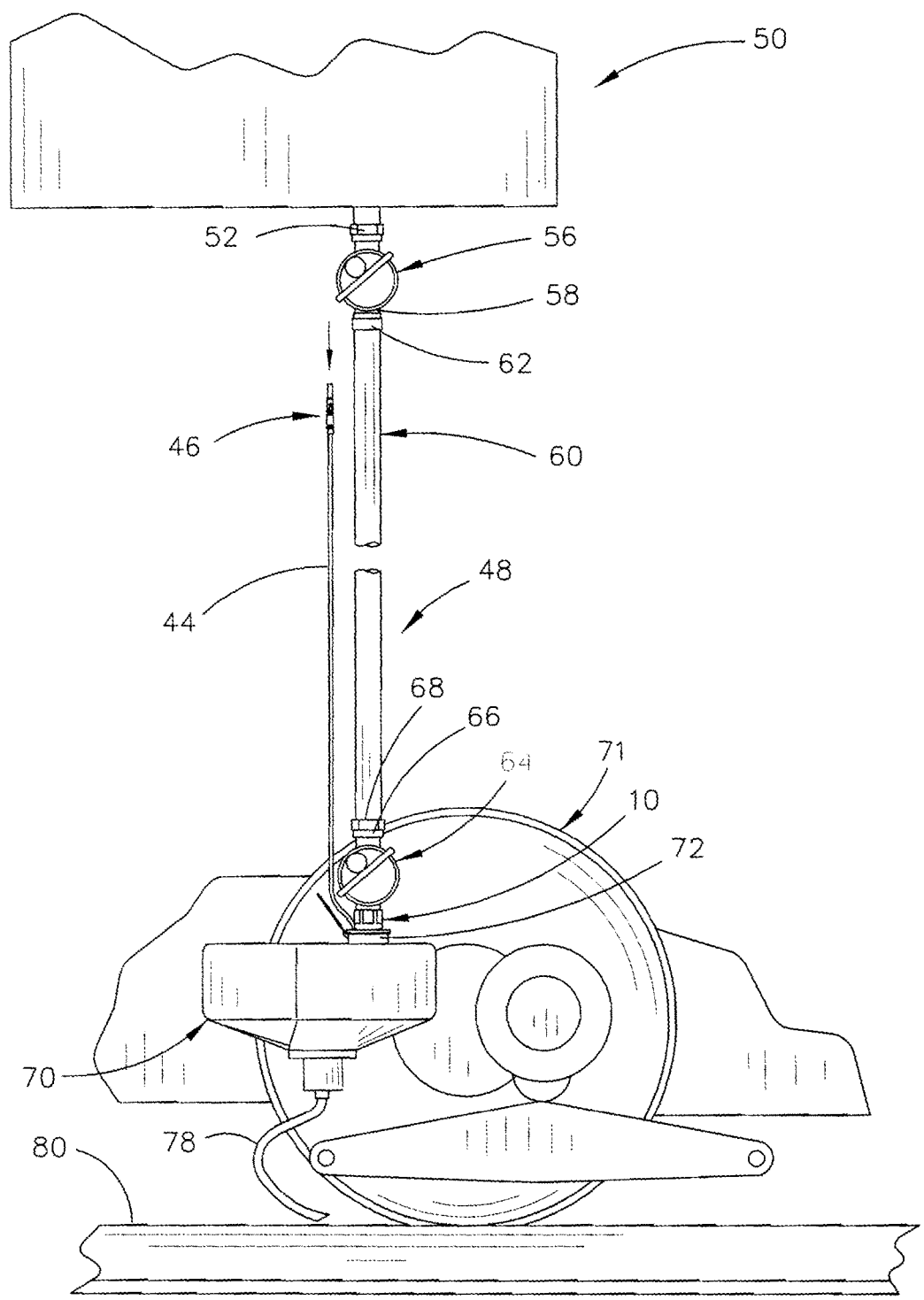
FIG. 7 is a partial side view illustrating the sand tower, upper valve, hose, lower valve and with the universal sealing nozzle of this invention being inserted into the fill tube of a sand box mounted on a locomotive.
Figure 8:
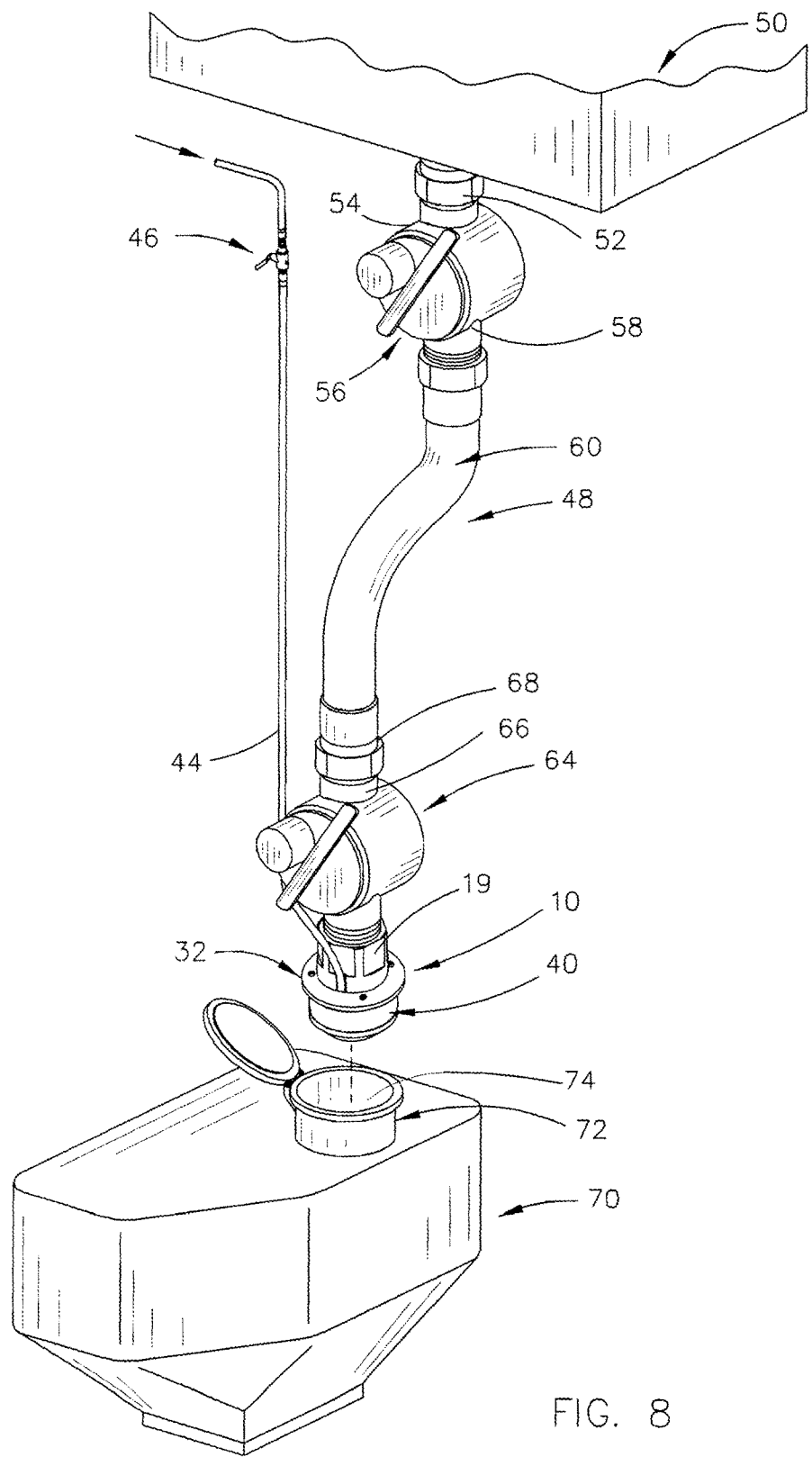
FIG. 8 is a perspective view of the invention with its relationship to a sand tower and a sand box.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the universal sealing nozzle of this invention. The nozzle 10 will be described as being used in a locomotive sanding system with the understanding that the universal sealing nozzle 10 may be used in various other situations. Further, although the nozzle 10 will be described as being vertically disposed with an upper end and a lower end, the nozzle 10 may be horizontally disposed or inclined depending upon the situation in which it is used.

Nozzle 10 includes an upper end 12 and a lower end 14. Nozzle 10 has a bore or passageway 16 formed therein which extends between the upper and lower ends thereof. The upper end of nozzle 10 has an internally threaded portion 18 formed therein. The exterior of the nozzle 10 has a plurality of radially spaced wrench flats 19 formed therein at the upper end to enable a wrench to be applied thereto.

Nozzle 10 includes a ring 20 which extends outwardly therefrom below the wrench flats 19. Ring 20 has a notch 22 formed therein as seen in the drawings. Nozzle 10 also has a ring 24 which extends outwardly therefrom below ring 20. Rings 20 and 24 have the same outer diameters. The rings 20 and 24 define an annular or ring-shaped recess 26 therebetween. Nozzle 10 includes a tapered nose portion 28 which extends downwardly and inwardly from ring 24. Ring 24 and tapered nose portion 28 are integrally formed.

The numeral 30 refers to an elongated groove which is formed in nozzle 10 and which extends downwardly from a flat 19, into nozzle 10 above ring 20, through ring 20 and into recess 26. In most situations, a support collar 32 is positioned on ring 20 and is secured thereto by screws 34 extending through openings 36 in support collar 32 and into the threaded openings 38 in ring 20.

Figure 9:
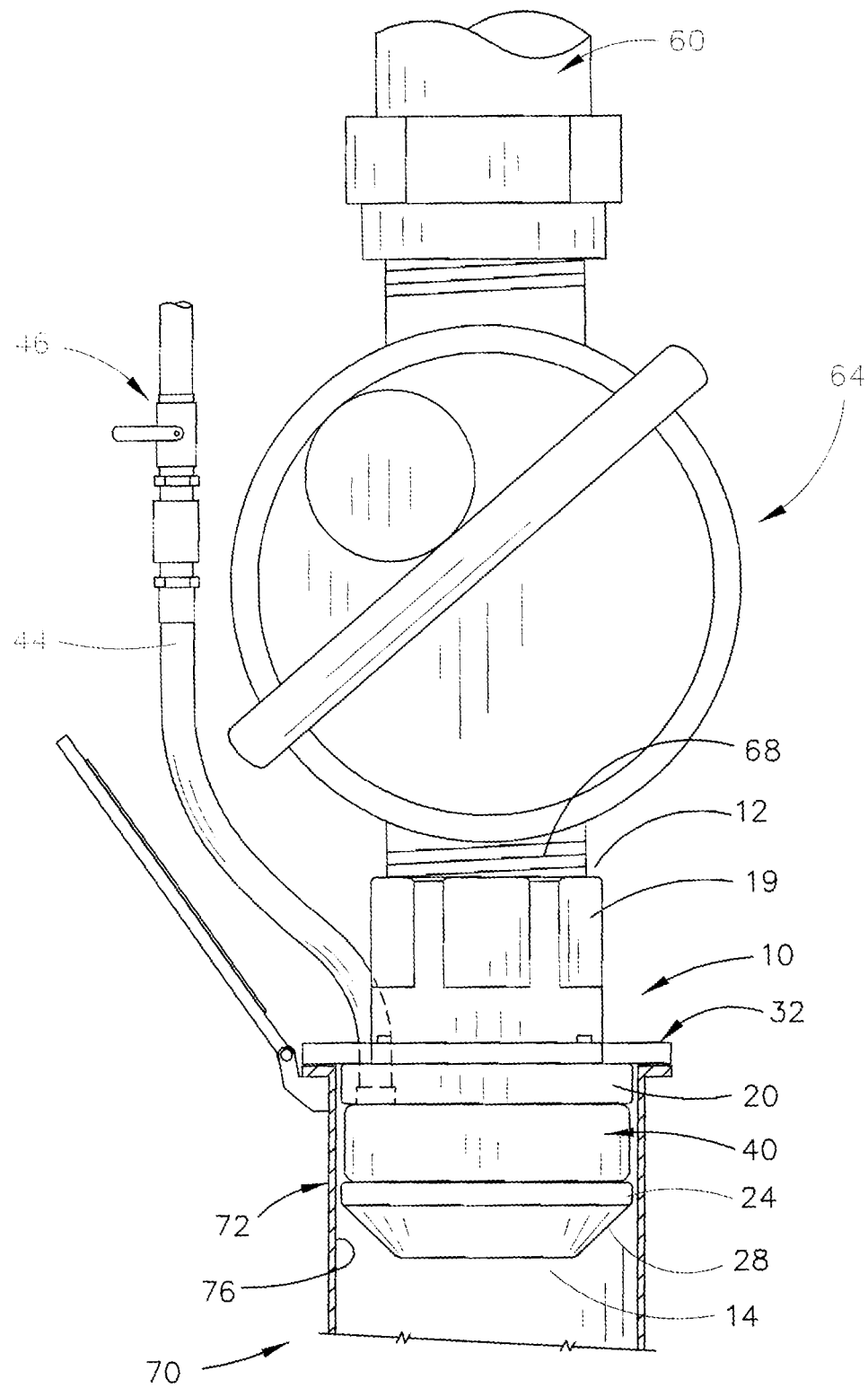
FIG. 9 is a partial side sectional view illustrating the universal sealing nozzle of this invention inserted into the fill tube of a sand box with the expansion seal thereof being in its retracted position.

The numeral 40 refers to an expandable ring-shaped expansion seal which is positioned in recess 26. Seal 40 has an end 42 of a hose 44 secured thereto for moving the seal between its retracted position to its expanded position. Hose 44 extends upwardly through groove 30 and notch 22 has a valve 46 secured thereto. When the seal 40 is in its retracted position as seen in FIG. 9, the outer side of the seal 40 is positioned slightly inwardly of the outer end of ring 20 and ring member 24.

A valve 46 is secured to the hose 44 and is in communication with a source of pressurized gas such as nitrogen or pressurized air. Valve 46 is preferably of the three position type. In a first position, valve 46 prevents pressurized gas from passing therethrough to the expansion seal 40. In a second position, valve 46 permits pressurized gas to pass therethrough to the expansion seal 40 to expand the same. In a third position, the pressurized gas in the expansion seal 40 and the hose 44 between expansion seal 40 and valve 46 is exhausted to the atmosphere.

The universal sealing nozzle 10 will be described in the drawings as being used with a locomotive sanding system 48. As stated above, the universal sealing nozzle may be used with different structures. The numeral 50 refers to a sand tower of conventional design. Sand tower 50 is filled with traction sand and includes a sand discharge outlet 52 which is in communication with the sand inlet end 54 of a valve 56 of conventional design. The valve 56 includes a sand discharge outlet 58. Valve 56 is selectively movable between open and closed positions. An elongated hose 60 has its sand inlet end 62 connected to the sand outlet end 58 of valve 56.

The numeral 64 refers to a valve which is preferably identical to valve 56. The sand inlet end 66 of valve 64 is connected to the sand outlet end 68 of hose 60. Valve 64 is movable between open and closed positions. Valve 64 includes a threaded lower end 68. The nozzle 10 has its upper end threadably secured to the lower end of valve 64.

As stated above, the universal sealing nozzle 10 is well suited for use with a locomotive sanding system 48. The locomotive 71 includes a plurality of sand boxes 70 mounted thereon. Each of the sand boxes 70 have a fill pipe or tube 72 which extends upwardly from the sand box 70. The tube 72 includes an open upper end 74. Tube 72 has an inner surface 76.

As seen, each of the sand boxes 70 have a pipe or hose 78 extending therefrom to deposit traction sand onto a railroad rail 80.

A sand box 70 is filled with traction sand as will now be described. Initially, valves 56 and 64 will be in the closed position. Initially, expansion seal 40 will be in its retracted or deflated condition. The hose 60 and the nozzle 10 will be manipulated so that the nozzle 10 may be inserted downwardly into the fill pipe 72 until support collar 32 rests on the upper end of fill pipe 72 as seen in FIG. 9.

Figure 10:
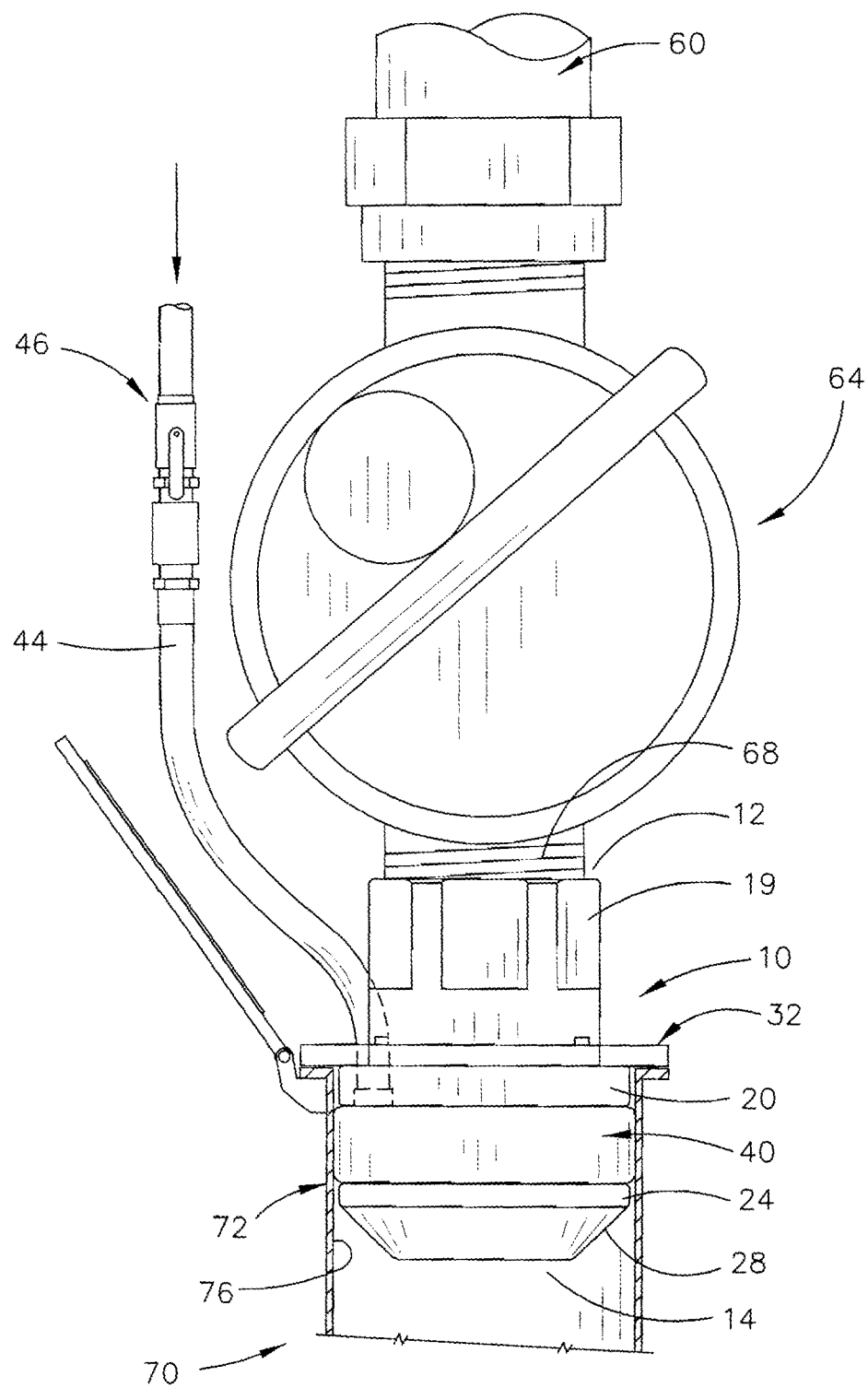
FIG. 10 is a view similar to FIG. 9 but which illustrates the expansion seal of the invention being in its expanded position so as to sealably engage the inside surface of the fill tube of the sand box which is mounted on a locomotive.

Valve 56 will then be opened so that the hose 60 is filled with sand. Valve 46 is then moved to a position wherein pressurized gas may pass therethrough to expand the expansion seal 40 as seen in FIG. 10. The expansion seal 40 expands outwardly so that the outer side of the expansion seal 40 sealably engages the inner surface 76 of fill pipe 72 as seen in FIG. 10.

The valve 64 is then opened so that the traction sand will flow downwardly through the nozzle 10 into the sand box 70. The expansion seal 40 prevents sand or dust in the sand box 70 from passing outwardly therefrom. When the sand box 70 is filled with sand, the valve 64 is closed. Valve 56 may also be closed if so desired. The valve 46 is then moved to a position whereby the pressurized gas in hose 44 between valve 46 and the expansion seal 40 is exhausted. The expansion seal 40 then moves to its retracted or deflated position to enable the nozzle 10 to be removed from the fill pipe 72. The cover of the fill pipe 72 is then closed.

The nozzle 10 prevents sand and dust from passing outwardly into the atmosphere. The fact that valve 64 is used on the hose 60 eliminates the need to drain the sand in hose 60 between uses.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A locomotive sanding system for conveying sand from a sand tower, having a sand inlet opening and a sand discharge opening, to a sand box mounted on the locomotive with the sand box having a hollow fill tube extending upwardly therefrom with the fill tube having an upper end, an outer side and an inner side, therefrom and with the sand inlet opening of the sand tower being in communication with a source of sand, comprising;
    a first valve having a sand inlet end and a sand discharge end;
    said first valve being selectively movable between open and closed positions;
    said sand inlet end of said first valve being in communication with the sand discharge end of the sand tower;
    said first valve permitting sand to pass downwardly therethrough when in said open position;
    said first valve preventing sand to pass downwardly therethrough when in said closed position;
    an elongated sand discharge tube having a sand inlet end and a sand discharge end;
    said sand inlet end of said sand discharge tube being in communication with said sand discharge end of said first valve;
    a second valve having a sand inlet end and a sand discharge end;
    said second valve being selectively movable between open and closed positions;
    said sand inlet end of said second valve being in communication with said sand discharge end of said sand discharge tube;
    said second valve preventing sand to pass downwardly therethrough when in said closed position;
    said second valve permitting sand to pass downwardly therethrough when in said open position;
    a sealing nozzle having an upper sand inlet end, a lower sand outlet end and a generally cylindrical body portion extending therebetween;
    said upper sand inlet end of said sealing nozzle being secured to said sand discharge end of said second valve;
    said generally cylindrical body portion of said sealing nozzle having an upper annular ring projecting outwardly therefrom;
    said upper annular ring having an outer side;
    said cylindrical body portion of said sealing nozzle having a lower annular ring projecting outwardly therefrom below said upper annular ring;
    said lower annular ring having an outer side;
    said upper and lower annular rings defining an annular recess therebetween;
    a ring-shaped expansion seal extending around said body portion and positioned in said annular recess between said upper and lower annular rings;
    said expansion seal having inner and outer sides;
    said expansion seal being selectively movable between retracted and expanded positions;
    said expansion seal being in communication with a source of pressurized gas for moving said expansion seal from said retracted position to said expanded position;
    said outer side of said expansion seal, when said expansion seal is in said retracted position, being substantially flush with said outlet sides of said upper and lower annular rings;
    said outer side of said expansion seal when said expansion seal is in said expanded position, being positioned outwardly of said outer sides of said upper and lower annular rings; and
    said nozzle being configured to be extended downwardly into the hollow fill tube whereby said expansion seal will move into sealing engagement with the inside surface of the hollow fill tube, when said expansion seal is moved to said expanded position, to prevent air and sand from being blown upwardly and outwardly from the sand box.

* * * * *